3,444,257
SELECTIVE HYDROCARBON HYDROGENATION
WITH METALLIC CADMIUM ON ALUMINA
Philippe A. Engelhard, 52 Ave. Foch, and Joseph Edouard
Weisang, 15 Rue du Docteur Suriray, both of Le Havre,
Seine-Maritime, France
No Drawing. Filed Feb. 13, 1967, Ser. No. 615,387
Claims priority, application France, Jan. 6, 1967,
90,299
Int. Cl. C07c 11/00; B01j 11/06
U.S. Cl. 260—677          11 Claims

ABSTRACT OF THE DISCLOSURE

Cadmium metal unexpectedly proves to be a highly selective hydrogenation catalyst, when deposited on a refractory oxide support (such as porous alumina), to provide highly selective results in the direct catalytic hydrogenation of small or even trace portions of acetylenic and di-olefinic hydrocarbons contained in hydrocarbon mixtures which are predominantly mono-olefinic and without hydrogenating the mono-olefinic hydrocarbons.

---

This invention relates to the direct and selective catalytic hydrogenation of hydrocarbons more unsaturated than olefins in mixture with olefins and, more particularly, to methods and metal catalyst compositions of such high selectivity that only such more unsaturated hydrocarbons are hydrogenated without hydrogenating the olefins and even when such more saturated hydrocarbons are present in the olefin mixture in only small or even merely trace concentrations.

As well understood in this art, it is especially important, with olefin mixtures destined to be used in polymerization reactions, to remove as completely as possible impurities or components of the olefin mixtures comprising hydrocarbons which are more unsaturated than olefins because such more unsaturated hydrocarbons may have an inhibiting tendency in catalytic polymerization reactions, even in concentrations as little as of the order of 5 p.p.m. or less. Reference to hydrocarbons more unsaturated than olefins, as used herein, is meant to include those having at least one triple bond between carbon atoms (such as acetylenic hydrocarbons) and those which have at least two double bonds between carbon atoms (such as di-olefins, tri-olefins, etc.) whether aliphatic or cyclic.

It is known to attempt adequate purification of such olefin mixtures and the removal therefrom of even trace portions of more unsaturated hydrocarbons, by fractional distillation into very narrow cuts and then removing the more unsaturated hydrocarbons from each fraction by solvent extraction. In many, if not most, instances, however, better or more practical results are achieved by directly hydrogenating the more unsaturated hydrocarbons while still in the olefin mixture but while avoiding the hydrogenation of the mono-olefins themselves. In such a situation, it is highly important to operate with a hydrogenation catalyst of extremely high selectivety in order to hydrogenate the more unsaturated hydrocarbons (even when they are present in only trace amounts) without hydrogenating or saturating the mono-olefins which are the desired end product.

Thus, a number of more or less selective catalysts are available for industrial use from among the various metals having hydrogenation catalyst properties. Among these, for example, may be noted molybdenum and cobalt deposited on an alumina support, nickel and copper alone or admixed with other metals, and noble metals such as platinum or palladium. With such known catalysts, however, the desired or optimum selectivity for the particular uses to which this invention relates can be approached only with difficulty and/or requires special measures for increasing the spatial velocity, controlling or preventing the poisoning of the catalyst activity by sulphur or water vapor, or controlling or limiting the hydrogen content of the reactant charge. Another example of a catalyst of high selectivity for the purpose of interest here may be noted in co-pending application Ser. No. 461,188, filed June 3, 1965, now Patent No. 3,404,101 in which is disclosed a catalyst formed of a mixture of chromium and nickel materials deposited on a refractory oxide support with enhanced results being achieved by an extremely uniform deposition of the catalyst metals on the adsorption surface of the support.

Even more greatly enhanced results in the selectivity of hydrogenation catalysts may be noted as those described in applicants' own co-pending application filed of even date herewith Ser. No. 615,612 filed Feb. 13, 1967 in which unexpectely enhanced high selectivity characteristics for hydrogenation catalysts are achived, particularly regarding hydrogenating hydrocarbons more unsaturated than mono-olefins present even as only trace amounts in mixtures of mono-olefins without saturating the mono-olefins, and comprising one or more of such metals as calcium, cobalt, copper, iron, nickel, and/or zinc deposited on an alumina support in such fashion that the acidity of the final catalyst material (i.e., after impregnation of the alumina support with a salt of the desired catalyst metals) is at or as near as possible to a minimum acidity. As noted in that case, the results in high selectivity achieved by such hydrogenation catalyst metals as so deposited on an alumina support is at least equal to or greater than the catalyst metals otherwise utilized, yet the ease and economy of producing the final catalyst material is greatly enhanced over prior concepts.

According to this invention, however, and as clearly distinguishable from all the foregoing prior developments, it has been discovered that, most unexpectedly, cadmium metal also produces exetremely high selectivity for the direct catalytic hydrogenation of hydrocarbons more unsaturated than mono-olefins, even when present in mono-olefin mixtures at no more than trace amounts, and without also hydrogenating the mono-olefins, when such cadmium catalysts are deposited on or impregnated into refractory oxide supports by the deposition thereon of soluble cadmium salts. Thus, there are provided in accordance herewith cadmium hydrogenation catalyst materials and methods for the production and use thereof with greater economy and simplicity than those required for other highly selective hydrogenation catalysts previously used, yet with the catalysts in accordance herewith producing at least as great or greater selectivity, notwithstanding the fact that the cadmium materials are not generally understood to be hydrogenation catalysts for treating unsaturated hydrocarbons. As described in more detail below, illustrative catalyst materials are set forth, as well as the means for depositing such materials on an appropriate refractory oxide support (such as alumina), to produce the enhanced hydrogenation selectivity in accordance herewith.

With the foregoing and additional objects in view, this invention will be described in more detail, and other objects and advantages thereof will be apparent from the following description and appended claims.

In the course of the developments leading to this invention and attempting to produce catalysts of greater selectivity than previously known or those which were at least as selective but considerably easier and cheaper to prepare in industrial scale quantities, it was discovered that enhanced results were achieved with various hydrogenation catalyst metals when (as disclosed in said co-pending application Ser. No. 615,612, filed Feb. 13, 1968) the concentration of catalyst deposited on or impregnated into an alumina support was such as to produce or approach the minimum surface acidity of the impregnated support. As noted in that co-pending application and as referred to herein, the phrase "adsorption surface" is intended to mean the actual active surface per gram of the porous catalyst support, determined by the procedure of Brunauer, Emmet and Teller (B.E.T.); that is to say by measuring the quantity of nitrogen adsorbed at $-195°$ C. on the support previously degasified at $+250°$ C. for 2 hours and at a pressure of $10^{-5}$ mm. Hg or less, and by considering that the surface occupied by a nitrogen molecule in a liquid state is about 16.2 A.$^2$, similarly, reference herein to minimum surface acidity is determined by chemisorption of ammonia at 175° C. following the method described by Webb in Industrial Engineering Chemistry (1957) 49, 261–3.

Among the unexpected peculiarities of the highly selective results noted regarding cadmium may be mentioned the fact that, although this invention evolved from developments followed in said co-pending application, at least some, if not most, of the metals disclosed therein have previously been known as catalysts for hydrogenating unsaturated hydrocarbons, whereas cadmium is not generally considered in this art in such a category. Similarly, the most optimum results of the catalyst materials in the co-pending case are achieved when the catalyst metals are deposited on an alumina support in a concentration to achieve or approach closely the minimum surface acidity level on the support.

By contrast, however, satisfactory results have been achieved in accordance herewith utilizing cadmium materials deposited on the support in concentration ranges considerably beyond anything approaching or related to a minimum acidity range. As a matter of fact, considering cadmium as the sole catalyst metal on an alumina support, it is extremely difficult, if not impossible, to achieve accurate acidity measurements in accordance with the above noted standard technique of cadmium on alumina supports because the analytical attempts to obtain acidity measurements and/or the acidity of the alumina support have a tendency to hide or disguise the cadmium or otherwise produce measurements which may not be reliable or accurate. In any event, whereas optimum results are achieved with the other metals noted in the co-pending application primarily when the surface acidity of the impregnated support is at a minimum, cadmium appears to be a special case because satisfactory results are achieved with that catalytic material in accordance herewith at concentration ranges varying widely from anything approaching a minimum acidity level.

Generally, in accordance herewith, satisfactory results are achieved utilizing, as the refractory oxide support, a wide variety of solid porous alumina materials, although those having an adsorption surface above at least 15 m.$^2$/gm. and a porous volume greater than about 0.1 cc./gm. are preferred. Most optimum results are achieved using alumina with an adsorption surface within the range of about 150–350 m.$^2$/gm. and with which a minimum surface acidity is achievable generally by the deposition on the alumina of metal within the range of about $3.0 \times 10^{-2}$ to $15.0 \times 10^{-2}$ millimoles per gram, although, as noted above, it is not necessary to approach minimum acidity using the cadmium materials in accordance herewith. For example, generally satisfactory results are achieved in accordance herewith if the amount of cadmium deposited on the alumina support is within the range of about 0.01–30% by weight of the catalyst. Actually, the catalytic activity decreases substantially if the cadmium content of the catalyst is below about 0.03%, and little, if any, advantage is achieved by having it over 3% by weight, so that these quantities define a preferred concentration range of cadmium on the alumina support in accordance herewith.

Cadmium catalysts in accordance herewith are satisfactorily prepared by immersing the refractory oxide support in a solution of a cadmium salt until such time as an equilibrium condition is established between the salt impregnated into or adsorbed on the support and the remaining cadmium salt concentration in the solution. Such impregnation is readily accomplished by immersing the support in a cadmium salt solution in which the concentration of cadmium salt is such that final equilibrium conditions will produce the desired amount of salt deposited on and retained by the support. Alternatively, various alumina supports can be continuously prepared by immersing them in a cadmium salt solution in which the concentration is maintained constant by additions of cadmium salt, or, in a third fashion, by immersing the alumina support in merely the cadmium solution solvent and then adding cadmium salt to adjust the concentration to that which will produce the desired deposition of cadmium salt on the support. Such concentrations are readily determinable without inventive experimentation by noting that the concentration of salt actually retained by the support is a function of (or indicated by) a comparison of the initial and final concentration of cadmium salt in the solution, so that a few simple trials suffice to indicate the final concentration of cadmium salt in the immersing solution which corresponds to the desired quantity of cadmium salt retained on the support.

After immersing the support until equilibrium conditions are achieved (which may take generally from about one to 24 hours and, preferably, within the range of 10 to 24 hours), the impregnated alumina support is dried (for example, at a temperature within the range of about 90°–130° C.) and then calcined at a temperature high enough to cause decomposition of the cadmium salt and elimination of the anion thereof (to leave metallic cadmium on the support), yet not substantially greater than about 825° C. Preferably, this calcining temperature is within the range of about 550°–650° C.

As will be apparent from the foregoing, any of a variety of inorganic or organic cadmium salts is available for satisfactory results in the production of the catalysts in accordance herewith, as well as aqueous or other solvents (such as alcohols or ethers). Generally, however, the particular salt selected should decompose below 825° C. (which generally eliminates the sulphate) and, preferably, should not increase or otherwise modify the surface acidity of the support (which generally eliminates the halides). Preferably, among the inorganic salts, the nitrates and carbonates give satisfactory results, as well as organic salts such as oxalates, acetates, formates, etc.

Utilizing such cadmium-containing catalysts in accordance herewith, satisfactory results are achieved in the highly selective hydrogenation of hydrocarbons more unsaturated than mono-olefins and present even as only trace amounts in mixtures which are predominantly mono-olefinic without also hydrogenating the mono-olefins when the hydrogenation reaction conditions are generally within the ranges of about 100°–300° C. temperature, 5–70 atms. pressure, and 500–6000 volumes of hydrocarbon charge per volume of catalyst per hour (v./v./h.) space velocity, and particularly with hydrocarbon mixtures which are predominantly in the 1–4 range of carbon atoms per molecule.

As further illustrative, but not limiting, of this aspect of the present invention, the following example and resulting data may be noted.

EXAMPLE

Five batches of catalysts were prepared by impregnating alumina with aqueous solutions of cadmium nitrate. The alumina utilized was in the form of 2–5 mm. diameter balls and had an adsorption surface of 235 m.$^2$/gm. and surface acidity of 0.360 meq./gm., while also having a microporous volume of about 0.546 cc./gm.

and a mean pore radius of about 48 A. Each of these catalysts was prepared by immersing 50 gm. of such alumina in 500 cc. of cadmium nitrate solution at room temperature, and the initial and final concentrations of the impregnating solutions are noted below in the table.

After impregnation, each catalyst was dried in a stove overnight and calcined for 8 hours at about 600° C. The retained cadmium content of these catalysts, as noted in the following table, were measured by effecting an oxidizing fusing of the crushed solid and then a polarographic measurement of the solution obtained in recovering the product of such fusing, with the cadmium in the impregnation solutions being measured by complexing.

The cadmium catalyst materials thus obtained were used for the selective hydrogenation of the acetylene component contained in an industrial or commercial hydrocarbon charge of the following composition:

| Constituent | Percent vol. | Percent weight |
| --- | --- | --- |
| Hydrogen | 12.83 | 1.07 |
| Methane | 29.81 | 19.91 |
| Ethane | 6.14 | 7.69 |
| Ethylene | 31.44 | 36.76 |
| Propane | 0.81 | 1.49 |
| Propylene | 18.23 | 31.97 |
| $CO_2$ | 0.01 | 0.02 |
| Butanes | Traces | Traces |
| Acetylene | 0.32 | 0.35 |
| Butene-1 | 0.02 | 0.05 |
| Isobutene | 0.05 | 0.12 |
| Butadiene | 0.03 | 0.07 |
| Propadiene | 0.11 | 0.18 |
| Propane | 0.18 | 0.30 |
| Cyclopropane | Traces | Traces |
| CO | 0.02 | 0.02 |

They were also used with a charge of the composition nitrogen 40 vol. percent hydrogen 15 vol. percent ethylene 45 vol. percent, and acetylene 3,000 p.p.m. In all the trials as to which data is noted in the table, the duration of the impregnation step in forming the catalyst was about 16 hours, and all the runs noted were accomplished at a reaction temperature of 250° C. and 8 atms. pressure. The particular runs reported as relating to catalyst 1 involved the first composition noted above, while those runs reported regarding catalysts 2–5 related to the selective hydrogenation of the second charge described above.

As will be apparent from review of the data set forth in the table, the cadmium-containing catalyst in accordance herewith and as deposited on alumina supports produced a high degree of selectivity for hydrogenation of hydrocarbons more unsaturated than mono-olefins and even when such hydrocarbons are present in virtually trace amounts in mono-olefin mixtures, without notably hydrogenating the mono-olefins to an undesired or commercially inexpedient extent. As a practical matter, as with the other catalysts herein disclosed, when operating under commercial conditions generally utilized in the industry for this type of operation, virtually all the more unsaturated hydrocarbons can be eliminated with a single pass through a conventional hydrogenation reactor with a concomitant loss of only a minimum of ethylene hydrogenated to ethane.

For example, in the foregoing trial catalyst 5, which contained 27.4% by weight of cadmium, is less active than the other four catalyst materials, each of which contains less cadmium. Similarly, if catalyst 4 is utilized at a space velocity of 3,000 v./v./h. instead of 2,000, some traces of unhydrogenated acetylene still remain in the ethylene gases, thus confirming the previously disclosed preference that the cadmium catalysts in accordance herewith should contain less than 3% by weight of cadmium. Nevertheless, the data in the table clearly indicate that highly satisfactory results and a great degree of hydrogenation selectivity are obtained with the cadmium-containing catalysts in accordance herewith even in those concentration ranges of cadmium on the alumina support which vary widely from metal concentrations giving acidity values near the minimum levels, in which area the most enhanced and optimum results are achieved in selectivity and efficiency regarding the other catalyst metals disclosed herein.

As will be apparent from all the foregoing, there are provided in accordance with this invention, metal catalyst materials and methods for the production and utilization thereof for enhanced results as selective hydrogenation catalysts, and under circumstances where the selectivity can be controlled to a sufficiently high degree for hydrogenating even trace amounts of hydrocarbons more unsaturated than mono-olefins and admixed therewith without also hydrogenating the mono-olefins. Such results are achieved with efficiencies and high selectivity at least as great or greater than any of the selective acetylenic hydrogenation catalysts previously known, and with catalyst materials the manufacture of which is considerably more simplified and/or economical than the previously known hydrogenation catalysts.

Furthermore, impregnating techniques are described whereby a particular quantity of retained metal catalyst is impregnated on an alumina support, merely by allowing an impregnating solution of controlled concentration to come into equilibrium with the supporting solid immersed therein, so that a controlled concentration of catalyst is achieved for optimum results. Furthermore, the teachings and developments hereof eliminate the necessity, with previously known catalyst materials, of activating the catalyst prior to use by a preliminary reducing reaction, and largely eliminate other difficulties with sulphur poisoning of the catalyst and other disadvantages of conventional techniques.

What is claimed is:

1. A hydrogenation catalyst composition of the character described and being highly selective for the direct catalytic hydrogenation of hydrocarbons more unsaturated than mono-olefins while admixed with mono-olefins and without saturating said mono-olefins, which consists essentially of a solid porous alumina support on which is

TABLE

| Catalyst | 1 | | | | | 2 | | | | 3 | | | 4 | | | 5 | | | |
| --- | --- | --- | --- | --- | --- | --- | --- | --- | --- | --- | --- | --- | --- | --- | --- | --- | --- | --- | --- |
| Conc. Cd (mmoles/l): | | | | | | | | | | | | | | | | | | | |
| Initial | 16.9 | | | | | 31 | | | | 71 | | | 222 | | | Saturation | | | |
| Final | 10.6 | | | | | 20.8 | | | | 60.5 | | | 204 | | | | | | |
| Wt. percent Cd in catalyst | 0.74 | | | | | 1.19 | | | | 1.70 | | | 3.35 | | | 27.4 | | | |
| Hydrogenation: | | | | | | | | | | | | | | | | | | | |
| Duration (hrs.) | .75 | 2.50 | 5.75 | 23.75 | 27.0 | .75 | 1.75 | 5.5 | 8.75 | | | .75 | 4.5 | 9.5 | 11 | 1.25 | 4.25 | 6.25 | 8 |
| Space velocity (v./v./h.) 1,000's | 3 | 3 | 3 | 3 | 3 | 3 | 3 | 2 | 2 | 1 | 2 | 3 | 2 | 2 | 2 | 2 | 2 | 2 | 2 |
| Results: | | | | | | | | | | | | | | | | | | | |
| Acetylene in effluent (p.p.m.) | 0 | 0 | 0 | 0 | 0 | 0 | 0 | 0 | 0 | 0 | 0 | 0 | 0 | 0 | 0 | 0 | 0 | 11 | 4 |
| Ratio in charge, ethane/ethylene | .210 | .210 | .210 | .210 | .210 | | | | | | | | | | | | | | |
| Ratio in product, ethane/ethylene | .234 | .233 | .231 | .221 | .221 | | | | | | | | | | | | | | |
| Ethylene loss, percent ethylene charged | 1.9 | 1.9 | 1.7 | 1.1 | 1.1 | | | | | | | | | | | | | | |
| Ethane in effluent (vol. percent) | | | | | | 0.3 | 0.3 | 0.2 | 0.2 | 5 | 1.5 | 1 | 0.5 | 0.4 | 0.1 | 0.1 | | Traces | | deposited a metallic catalyst material consisting essentially of cadmium substantially within the range of about 0.01% to 30% by weight of said catalyst composition.

2. A catalyst composition as recited in claim 1 in which the quantity of said cadmium deposited on said support is substantially within the range of about 0.03% to 3% by weight of said catalyst composition.

3. A catalyst composition as recited in claim 1 in which said porous alumina support has a specific surface greater than at least about 15 m.$^2$/gm. and a porous volume greater than about 0.1 cc./gm.

4. A catalyst composition as recited in claim 3 in which said porous alumina support has a specific surface substantially within the range of about 150–350 m.$^2$/gm.

5. A catalyst composition as recited in claim 1 in which the quantity of said cadmium deposited on said support is substantially within the range of about $3.0 \times 10^{-2}$ to $15.0 \times 10^{-2}$ millimoles of cadmium per gram of alumina.

6. In a method for the preparation of a highly selective catalyst of the character described for the direct catalytic hydrogenation of hydrocarbons more unsaturated than mono-olefins while admixed with mono-olefins without also hydrogenating said mono-olefins, the steps which comprise in combination immersing a solid and porous alumina support for said catalyst in a solution of a cadmium salt, maintaining said alumina support immersed in said solution for adsorption and impregnation with said cadmium salt until equilibrium is reached between the concentration of said cadmium salt in said solution and the concentration of said cadmium salt adsorbed and impregnated into said alumina support and which equilibrium is adjusted to produce a percent deposition in the range of 0.01% to 30% by weight of the final catalyst composition, removing said alumina with said salt deposited thereon from said solution, drying said alumina with said cadmium salt thereon, and calcining said alumina for decomposing said salt and leaving the metallic cadmium thereof on said alumina, said calcining step being at a temperature above the decomposition temperature of said cadmium salt and less than about 825° C.

7. A method as recited in claim 6 in which the initial concentration of said cadmium salt in said solution prior to immersing said alumina support therein is substantially the final concentration of cadmium desired to be deposited on said support.

8. A method as recited in claim 6 in which the concentration of said cadmium salt in said solution is maintained substantially constant during said immersion and said impregnation of said support and until said equilibrium is reached.

9. A method as recited in claim 6 in which the concentration of said cadmium salt in said solution is substantially less than that desired for depositing on said support, and in which the concentration of said salt is increased during immersion of said cadmium in said solution until a higher final concentration is reached.

10. A method as recited in claim 6 in which the solvent of said cadmium salt solution is selected from the group consisting of water and organic solvents, and in which said cadmium salt is selected from the group consisting of inorganic and organic salts of cadmium which are soluble in said solvent and which decompose to yield cadmium metal at temperatures less than about 825° C.

11. In a method for the selective direct catalytic hydrogenation of hydrocarbons more unsaturated than mono-olefins and contained as minor constituents in hydrocarbon mixtures which are predominantly mono-olefinic without hydrogenating said mono-olefinic components of said mixtures, the steps which comprise in combination introducing said hydrocarbon mixtures along with a hydrogen-containing gas into a reaction zone for said selective hydrogenation thereof, providing in said hydrogenation zone a catalyst comprising a porous alumina support having deposited thereon cadmium as a hydrogenation catalyst metal, consisting essentially in an amount from 0.01% to 30% based on the weight of said support and said cadmium metal, and maintaining the reaction conditions within said hydrogenation zone substantially within the ranges of about 100° to 300° C. temperature, 50 to 70 atms, pressure, and 500 to 6,000 v./v./h. space velocity of the hydrocarbon mixture charge.

References Cited
UNITED STATES PATENTS

| 3,076,858 | 2/1963  | Frevel et al. | |
| 3,278,453 | 10/1966 | Wennerberg | 260—680 |
| 3,309,417 | 3/1967  | Wennerberg | 260—680 |

HERBERT LEVINE, *Primary Examiner.*

U.S. Cl. X.R.

208—143; 252—463